United States Patent

Morita et al.

[11] Patent Number: 5,953,334
[45] Date of Patent: Sep. 14, 1999

[54] ATM SWITCHING SYSTEM

[75] Inventors: Sumie Morita, Kawasaki; Yuzou Kawamura, Yokohama; Emi Hata; Shigeru Sekine, both of Kawasaki, all of Japan

[73] Assignee: Fujitsu Limited, Kanagawa, Japan

[21] Appl. No.: 08/680,132

[22] Filed: Jul. 15, 1996

[30] Foreign Application Priority Data

Sep. 25, 1995 [JP] Japan .................................. 7-246266

[51] Int. Cl.⁶ ........................................................ H04J 3/24
[52] U.S. Cl. ........................... 370/389; 370/251; 370/395
[58] Field of Search .................... 370/389, 394, 370/395, 252, 251, 254, 238, 522, 524; 379/100.06, 100.05, 152, 154

[56] References Cited

U.S. PATENT DOCUMENTS

| 5,481,534 | 1/1996 | Beachy et al. | 379/114 |
| 5,548,587 | 8/1996 | Bailey et al. | 370/395 |
| 5,553,057 | 9/1996 | Nakayama | 370/395 |
| 5,623,405 | 4/1997 | Isono | 379/114 |
| 5,751,799 | 5/1998 | Mori | 379/114 |

FOREIGN PATENT DOCUMENTS

| 4-127763 | 4/1992 | Japan . |
| 4-369941 | 12/1992 | Japan . |
| 5-30132 | 2/1993 | Japan . |
| 5-122405 | 5/1993 | Japan . |
| 5-122695 | 5/1993 | Japan . |
| 5-199223 | 8/1993 | Japan . |
| 5-227155 | 9/1993 | Japan . |
| 5-292082 | 11/1993 | Japan . |
| 5-327703 | 12/1993 | Japan . |
| 6-46078 | 2/1994 | Japan . |
| 6-62152 | 3/1994 | Japan . |
| 07095323 | 4/1995 | Japan . |
| 07226745 | 8/1995 | Japan . |

Primary Examiner—Dang Ton
Attorney, Agent, or Firm—Helfgott & Karas, PC.

[57] ABSTRACT

An ATM (asynchronous transfer mode) switching system is capable of performing a charging process, while suppressing a data communication amount used to acquire data required for a charging process. The ATM switching system is arranged by comprising: a charging data processing unit for counting a quantity of transmitted ATM cells with respect to each of transmission destinations, and for notifying the count value as charging data; a charging information processing unit for requesting the charging data processing unit to notify the charging data, and for notifying charging information produced based on the charging data; and a control unit for requesting the charging information processing unit to notify the charging information.

5 Claims, 9 Drawing Sheets

ATM SWITCHING SYSTEM

BACKGROUND OF THE INVENTION

1. Field of the Invention

The present invention relates to an ATM (asynchronous transfer mode) switching system.

2. Description of the Related Art

In an ATM system constituting a major technique of a B-ISDN (Broadband-Integrated Services Digital Network), data is transferred using an ATM cell.

The ATM cell is transferred not via a software process, but via only a hardware such as an ATM switching system. This is because a large amount of data is transferred at high speed.

On the other hand, for instance, a telephone charging system is established by calculating charging data based on call connecting time, whereas an ATM charging system is established by calculating charging data based on the quantity of transferred ATM cells.

Then, an ATM switching system frequently must acquire data required for a charging process when the charging process is carried out, since ATM cells are transferred at high speed. This may cause a communication amount within the ATM switching system to be increased. As a result, the increase in the communication amount would impede other functions of the ATM switching system and therefore would lower the reliability of ATM switching system.

On the other hand, in another ATM switching system for performing a charging process, if this ATM switching system does not frequently acquire the data necessary for the charging process, then such a memory for temporarily storing the data required for the charging process must be employed. No clear indication how to employ such a memory has been so far made.

SUMMARY OF THE INVENTION

The present invention has been made to solve the above-described problems, and therefore, has a first object to provide an ATM switching system capable of performing a charging process, while suppressing a data communication amount used to acquire the data required for the charging process.

Also, the present invention has a second object to provide an ATM switching system capable of performing a charging process in the case that the charging rate varies depend on a time range, while suppressing a data communication amount used to acquire the data required for the charging process.

To achieve the above-described first object, a first ATM switching system according to the present invention is so arranged as follows. FIG. 1 is a schematic block diagram for representing a basic idea of a first charge processing apparatus.

That is, the first ATM switching system (switchboard) is arranged by employing a charging data processing unit 11, a charging information processing unit 21, and a control unit 31.

The charging data processing unit 11 counts a quantity of transmitted ATM cells with respect to each of transmission destinations, and notifies the count value as charging data.

The charging information processing unit 21 requests the charging data processing unit to notify the charging data, temporarily stores therein the notified charging data, and further notifies the charging information produced based on the charging data.

The control unit 31 requests the charging information processing unit 21 to notify the charging information.

To achieve the first object, a second ATM switching system according to the present invention is arranged as follows:

That is, in the first ATM switching system, the charging data processing unit 11 includes a first counter and a second counter that count the quantity of said ATM cells; and while any one of the first and second counters counts the quantity of the ATM cells, the other of the first and second counters notifies the values which have been so far counted by the counter as charging data to the charging information processing unit 21.

To achieve the first object, a third ATM switching system according to the present invention is arranged as follows:

That is, in the first ATM switching system, the control unit 31 requests the notification of the charging information in a preselected time period when said transmission destination is connected in a permanent virtual connection (PVC) mode; and requests the notification of the charging information when a telephone conversation is completed in the case that the transmission destination is connected in a switched virtual connection (SVC) mode.

To achieve the first object, a fourth ATM switching system according to the present invention is arranged as follows:

That is, in the first ATM switching system, the control unit 31 requests the notification of the charging information every predetermined time when telephone communication time of a call issued from the transmission destination connected in the switched virtual connection (SVC) mode exceeds predetermined time.

To achieve the first object, a fifth ATM switching system according to the present invention is arranged as follows:

That is, in the first ATM switching system, the charging data processing unit 11 is provided with a unit 10 for separately performing a call process with respect to said transmission destination. The charging information processing unit 21 is connected to the call separate processing unit 10 and is provided with a common unit 20 for processing the ATM cells processed by the call separate processing unit 10 in a batch processing manner. Furthermore, the control unit 31 is provided with such a switchboard processor 30 for controlling the call separate processing unit 10 via said common unit 20.

To achieve the first object, a sixth ATM switching system according to the present invention is arranged as follows:

That is, in the fourth ATM switching system, the control unit 31 requests the notification of the charging information when the standard time is changed within the predetermined time period.

To achieve the second object, a seventh ATM switching system according to the present invention is arranged as follows:

That is, in the first ATM switching system, the charging information processing unit 21 adds the charging data with each other with respect to the sections of charging rates per unit hour, depending upon time ranges.

According to the first and fifth ATM switching systems of the present invention, the notification of the charging data is requested from the charging information processing unit 21 to the charging data processing unit 11. As a result, the charging data is notified from the charging data processing unit 11 to the charging information processing unit 21. Also, the notification of the charging information is required from the control unit 31 to the charging information processing unit 21. As a result, the charging information is notified from the charging information processing unit 21 to the control unit 31.

In accordance with the second ATM switching system of the present invention, while any one of the first and second counters counts the quantity of the ATM cells, the other of the first and second counters notifies the values which have been so far counted by the counter as charging data to said charging information processing unit 21.

In accordance with the third ATM switching system of the present invention, the control unit 31 requests the charging information processing unit 21 to notify the charging information in a preselected time period when the transmission destination is connected in the permanent virtual connection mode, and also requests the notification of the charging information when a telephone conversation is completed in the case that the transmission destination is connected in the permanent virtual connection mode.

In accordance with the fourth ATM switching system of the present invention, the control unit 31 requests the charging information processing unit 21 to notify the charging information every predetermined time when the telephone communication time of a call issued from the transmission destination connected in the permanent virtual connection mode exceeds predetermined time.

In accordance with the fifth ATM switching system of the present invention, the control unit requests the charging information processing unit 21 to notify the charging information when the standard time is changed within the predetermined time period.

In accordance with the seventh ATM switching system of the present invention, the charging information processing unit 21 adds the charging data with each other with respect to the sections of charging rates per unit hour, depending upon time ranges.

BRIEF DESCRIPTION OF THE DRAWINGS

For a better understanding of the present invention, reference is made of a detailed description to be read in conjunction with accompanying drawings, in which.

DETAILED DESCRIPTION OF THE PREFERRED EMBODIMENTS

Referring now to drawings, an ATM switching system according to an embodiment of the present invention will be described.

Figure 1:
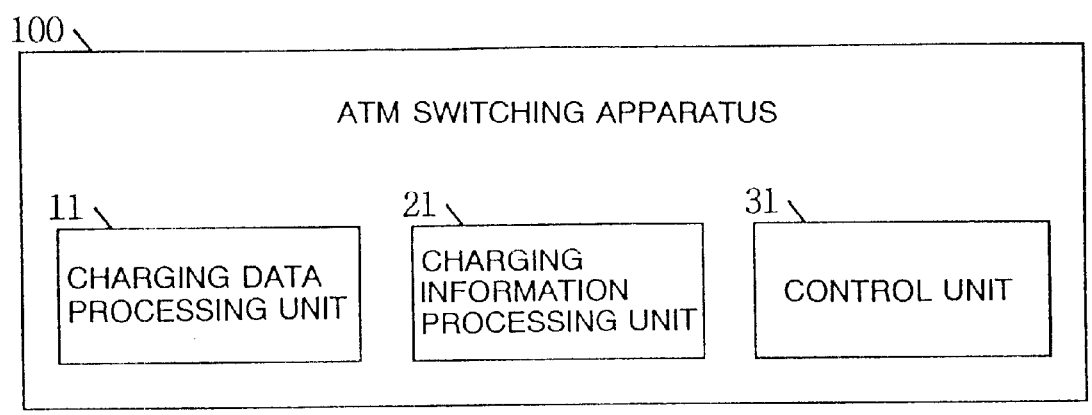
FIG. 1 is a schematic block diagram for showing a basic idea of an ATM switching system according to the present invention.
Figure 2:
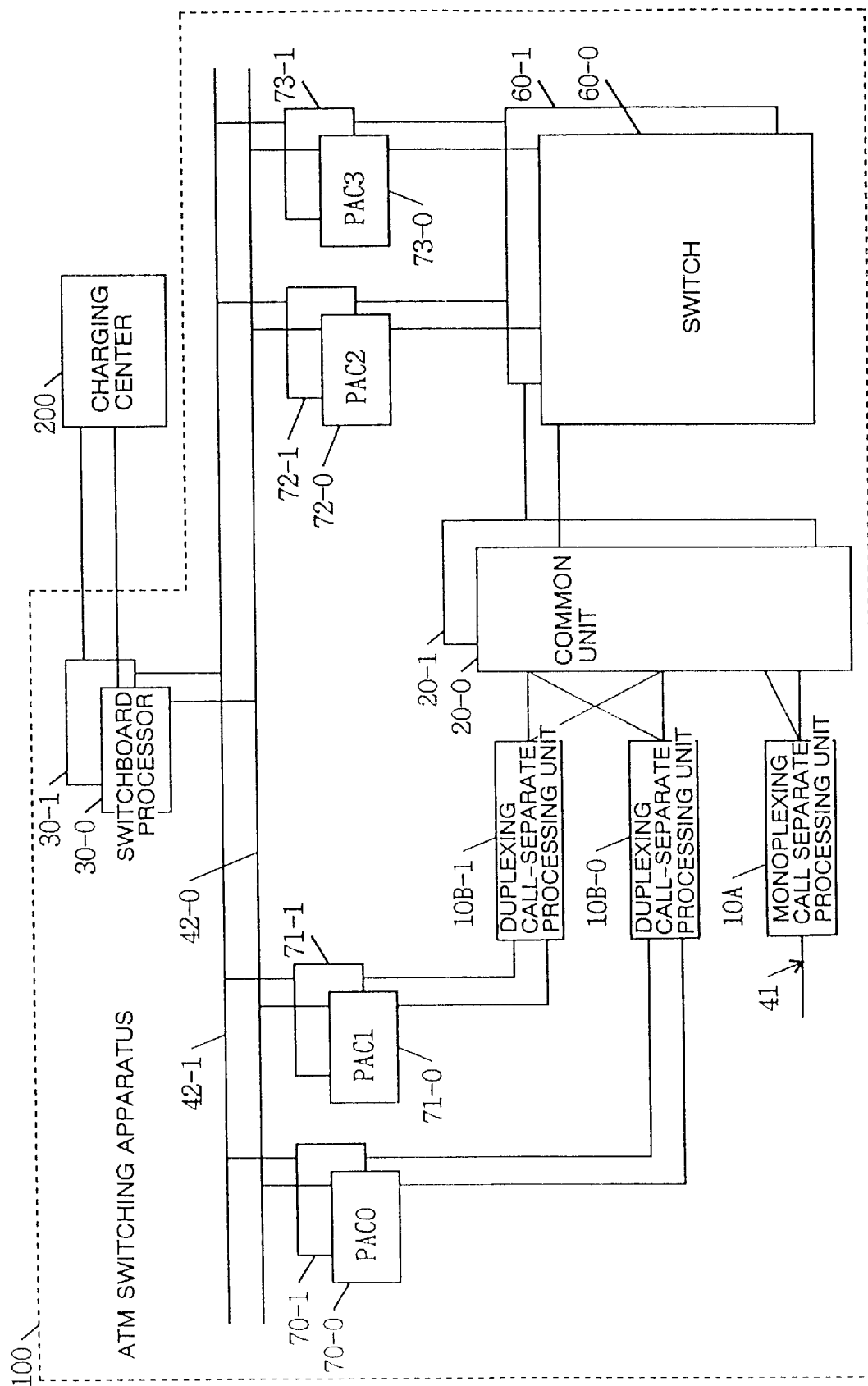
FIG. 2 is a schematic block diagram for showing an overall arrangement of an ATM switching system according to an embodiment of the present invention.

FIG. 2 schematically shows an overall arrangement of the ATM switching system according to the embodiment of the present invention. As indicated in this drawing, this embodiment is arranged by employing an ATM switchboard (switching apparatus) 100 and a charging (billing) center 200 connected via a line X.25 to this ATM switchboard 100.

The ATM switchboard 100 and the charging center 200 will now be explained as follows:

ATM SWITCHBOARD 100

The ATM switchboard (switching apparatus) 100 is constructed of switchboard processors 30-0 to 30-1; interface processors (PAC) 70-0, 71-0, 72-0, 73-0, 70-1, 71-1, 72-1, 73-1; switches 60-0 to 60-1; common units 20-0 to 20-1; and a call separate processing unit 10.

(A) Switchboard Processors 30-0 to 30-1

The above-described switchboard processor 30-0 corresponds to a switchboard process for a zero (0) system (present operation system), and is connected to a repeater line 42-0 of the zero (0) system and also to the charging center 200.

The switchboard processor 30-1 corresponds to a switchboard processor for an 1 system (spare operation system), and is connected to a repeater line 42-1 of the 1 system and also to the charging center 200.

It should be noted that the switch processor 30 executes the charging process and the like in accordance with a program previously stored in a ROM (not shown).

(B) Interface Processors 70-0, 71-0, 72-0, 73-0, 70-1, 71-1, 72-1, 73-1

The interface processors 70-0, 71-0, 72-0, 73-0 are interface processors for the 0 system, and are connected to the repeater line 42-0 of the 0 system.

The interface processors 70-1, 71-1, 72-1, 73-1 are interface processors for the 1 system, and are connected to the repeater line 42-1 of the 1 system.

(C) Switches 60-0 to 60-1

The switch 60-0 is a switch for the 0 system, and is connected to the interface processor 72-0, 73-0.

The switch 60-1 is a switch for the 1 system, and is connected to the interface processors 72-1, 73-1.

(D) Common Units 20-0 to 20-1

The common unit 20-0 is a common unit for the 0 system, and is connected to the switch 60-0.

The common unit 20-1 is a common unit for the 1 system, and is connected to the switch 60-1.

It should be noted that the common unit 20 processes ATM cells in the batch processing, which have been processed by the monoplexing call separate processing unit 10A.

(E) Call Separate Processing Unit 10

A call separate processing unit 10 separately performs call processing operations with respect to transmit destinations (subscriber terminals), and is arranged by duplexing call separate processing units 10B-0 to 10B-1, and a monoplexing call separate processing unit 10A.

The duplexing call separate processing unit 10B-0 corresponds to a duplexing call separate processing unit for the 0 system, and is connected to the common units 20-0 to 20-1 and also to the interface processors 70-0 to 70-1.

The duplexing call separate processing unit 10B-1 corresponds to a duplexing call separate processing unit for the 1 system, and is connected to the common units 20-0 to 20-1 and also to the interface processors 71-0 to 71-1.

The monoplexing call separate processing unit 10A is connected to a subscriber line 41 to which 4,096 sets of subscriber terminals (not shown in detail) are connected at maximum, and also connected to the common units 20-0 to 20-1.

Figure 3:
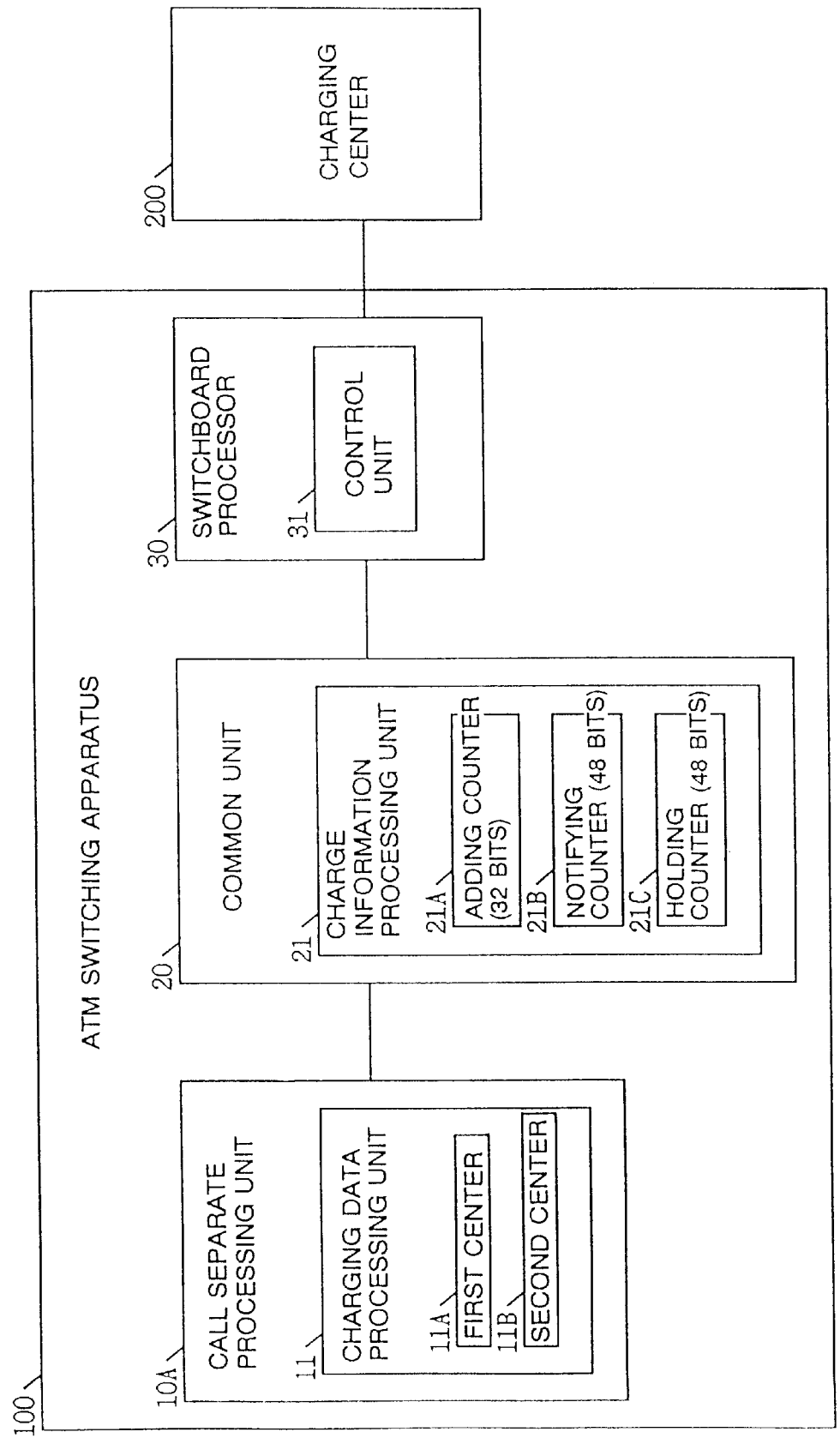
FIG. 3 represents a functional block diagram of the ATM switching system according to an embodiment of the present invention.

Referring now to FIG. 3, functional blocks provided with the call separate processing unit 10, common unit 20, and switchboard processor 30, respectively, that is, a charging data processing unit 11, a charging information processing unit 21 and a control unit 31 will be explained.

(a) Charging Data Processing Unit 11

The charging data processing unit 11 includes a first counter (current counter) 11A and a second counter (previous counter) 11B, which are alternately switched. Any one of these first and second counters 11A and 11B counts the quantity of ATM cells transmitted from the transmission destinations, depending upon the destinations.

Then, while any one of the first and second counters counts the quantity of ATM cells, the other counter counts the quantity of ATM cells every 1 minute, which have been transmitted from the transmission destination using the so far counted values as charging data, and the charging data processing unit 11 notifies to count value as charging data to the common unit 20.

Furthermore, the charging data processing unit 11 is required to send the charging data by the charging information processing unit 21 when a completion of a telephone conversation is notified in the case that the transmission destination is connected in the switched virtual connection (SVC) mode.

In this case, when the notification is required, if the count value of the previous counter 11A has been notified as charging data, the charging data processing unit 11 notifies the count value of the current counter 11B as above-described charging data to the charge information processing unit 21.

Then, when the notification is required, if the count value of the previous counter 11A has not yet been notified as charging data, the charging data processing unit 11 notifies the total value of the count values of the previous counter 11A and the current counter 11B as above-described charging data to the charge information processing unit 21.

(b) Charging Information Processing Unit 21

The charging information processing unit 21 requests the charging data processing unit 11 to notify the charging data.

The charging information processing unit 21 includes an adding counter 21A of a 32-bit length, which adds the values contained in the charging data notified from the charging data processing unit 11.

Then, charging information processing unit 21 includes a notifying counter 21B having a 48-bit length, which reads out the count values of the adding counter 21A every 15 minutes so as to add these count values until the notification request is issued from the control unit 31. The count values of this notifying counter 21B are notified as charging information to the control unit 31 when the notification request is issued from the control unit 31.

Furthermore, the charging information processing unit 21 includes a holding (saving) counter 21C for holding such a count value when the count value of the notifying counter 21B is notified until the subsequent count value of the notifying counter 21B is notified.

Figure 4:
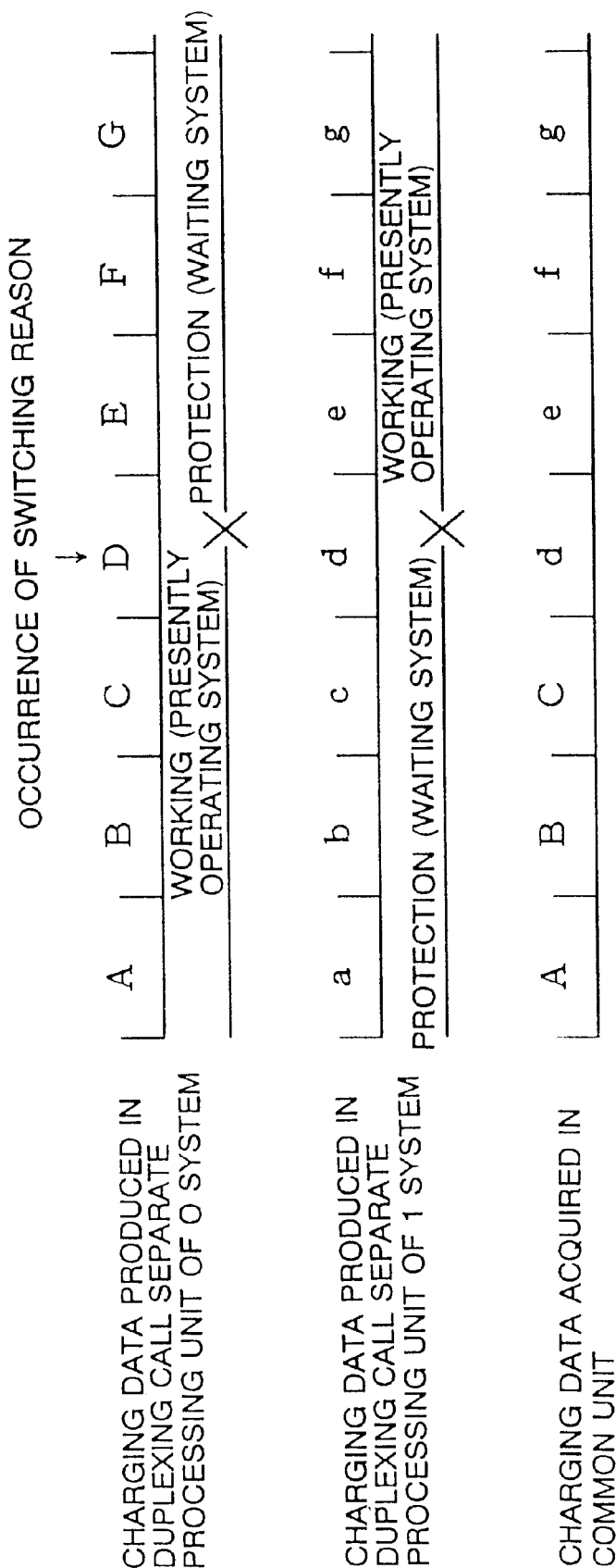
FIG. 4 conceptionally shows a switching process operation effected when charging data is acquired from a duplexing call separate processing unit employed in the ATM switching system according to the embodiment of the present invention.

It should be noted that the charging information processing unit 21 may acquire the charging data from the charging data processing unit 11 employed in the duplexing call separate processing units 10B-0 to 10B-1 by switching the 0 system and the 1 system. FIG. 4 shows a conceptional diagram of a switching process.

As indicated in FIG. 4, charging data "A", "B", "C",—are sequentially produced in the duplexing call separate processing unit 10B-0 of the 0 system, whereas charging data "a", "b", "c",—are sequentially produced in synchronism with the charging data "A", "B", "C",—in the duplexing call separate processing unit 10B-1 of the 1 system. It is now assumed that the switching reason happens to occur from the duplexing call separate processing unit 10B-0 of the 0 system when the charging data of "D" is acquired.

The charging information processing unit 21 acquires as charging data, "A", "B", "C" produced in the duplexing call separate processing unit 10B-0 of the 0 system before the above-described switching reason happens to occur, and acquires as charging data, "d", "e", "f", "g" produced in the duplexing call separate processing unit 10B-1 of the 1 system after the switching reason happens to occur.

As described above, the duplexing call separate processing unit 10B-0 of the 0 system is operated as presently operating system before the switching reason happens to occur, and is operated as waiting system after the switching reason happens to occur. Also, the duplexing call separate processing unit 10B-1 of the 1 system is operated as waiting system before the switching reason happens to occur, and is operated as presently operating system after the switching reason happens to occur.

(C) Control Unit 31

As explained in the below-mentioned items 1) to 3), the control unit 31 requests the charging information processing unit 21 to notify the charging information.

1) When the subscriber terminal is connected in the permanent virtual connection (PVC) mode, the notification of the charging information is required every predetermined time period (for example, 15 minutes, 30 minutes, 1 hour).

2) When the subscriber terminal is connected in the switched virtual connection (SVC) mode, the notification of the charging information is required when the telephone conversation is completed.

3) When the telephone communication time of the call issued from the subscriber terminal connected in the switched virtual connection (SVC) mode exceeds 24 hours, the control unit 31 judges it as "long time call" and then requires the notification of the charging information every 24 hours.

Also, the control unit 31 requests the notification of the charging information when the standard time is changed due to summer time and winter time during a preselected time period. For instance, it is now assumed that when the notification of the charging information is required in a time interval of 30 minutes every time instant for indicating xx hours 30 minutes (symbol "xx" being equal to 1 to 24), the standard time is changed due to summer time. That is, in the case that 2:00 AM, on the first Sunday of July, is changed into 3:00 AM, when it becomes 3:00 AM at the time instant after the standard time is changed, the notification of the charging information is required.

It should be noted that the charging information notified to the control unit 31 is notified to the charging center 200.

As described above, the above-explained ATM switchboard 100 is arranged by the dual system of the 0 system (presently operating system) and the 1 system (waiting system). When the failure happens to occur in the 0 system, the operating system is switched to the 1 system, so that the charging process and the like can be continued.

CHARGING CENTER 200

The charging center 200 calculates the charging amounts with respect to the respective subscribers based on the charging information notified from the ATM switchboard 100, and performs such a process operation to issue billing notes.

Processing Examples By Charging Center 200

A description will now be made of a charging data regularly acquiring process, a counter switching process, an aggregation process, a long time call judging process, and an SVC conversation ending process which are executed by the charging center 200 as processing examples thereof.

(A) Charging Data Regularly Acquiring Process

Figure 5:
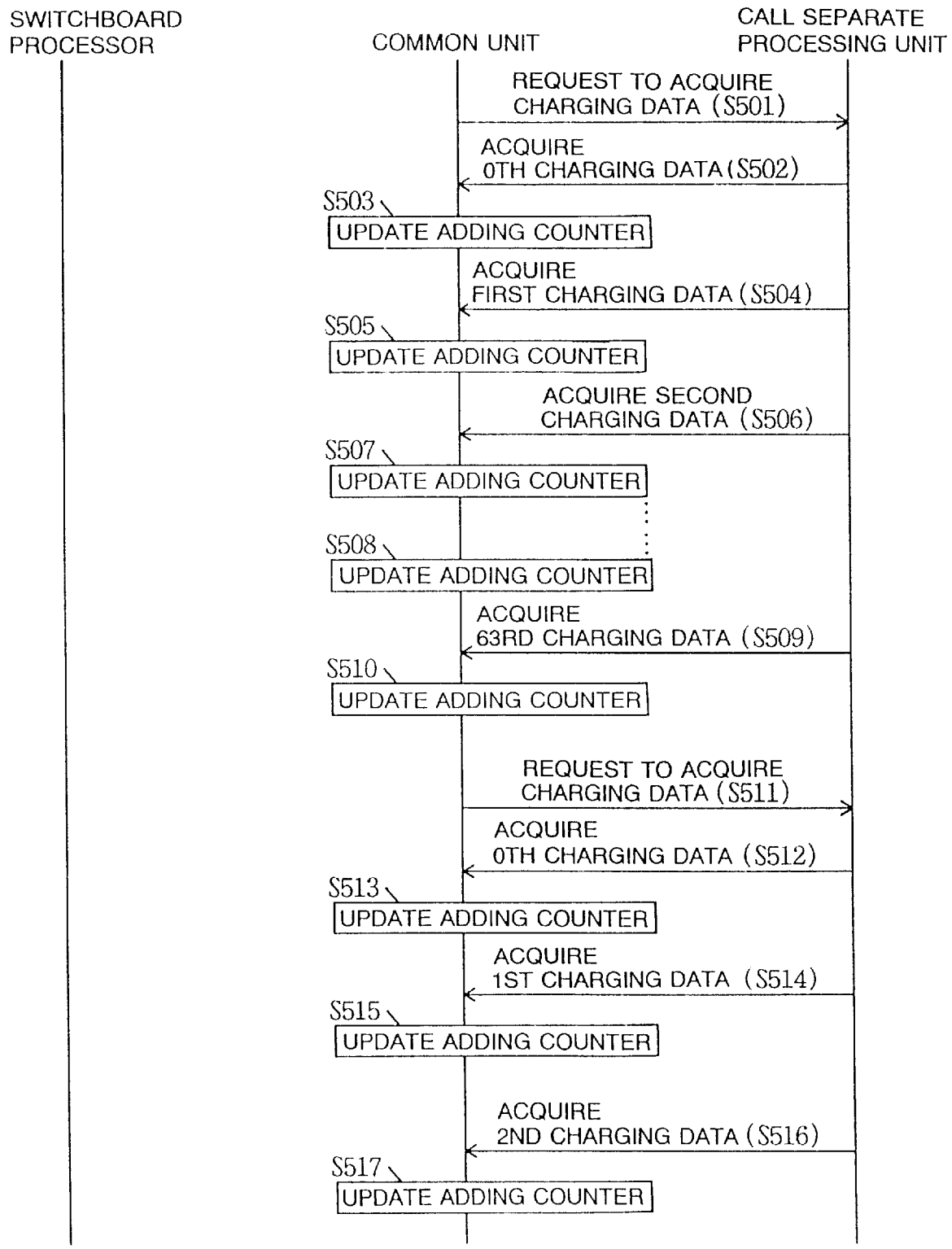
FIG. 5 is a sequence diagram for representing a process operation to regularly acquire the charging data in the ATM switching system according to the embodiment of the present invention.

FIG. 5 is a sequence diagram for indicating the charging data regularly acquiring process.

First, the charging information processing unit 21 of the common unit 20 (will be explained as "common unit 20" hereinafter) requires the charging data processing unit 11 of the call separate processing unit 10 (will be explained as "call separate processing unit 10" hereinafter) to acquire the charging data (step 501).

Next, the call separate processing unit 10 notifies the 0th charging data to the common unit 20 (step 502).

Then, when the charging data is notified, the common unit 20 adds the count value contained in the charging data to the count value of the adding counter 21A, thereby updating the adding counter 21A (step 503).

Subsequently, the call separate processing unit 10 notifies a plurality of charging data up to the 63rd charging data at maximum to the common unit 20 (step 504, step 506, and step 509). The reason why the 63rd charging data are limited as the maximum charging data is such that the total number of lines connectable with a single call separate processing unit 10 is 4,096, and the Nth charging data (N=0 to 63) is arranged by containing the charging data about the 64 lines.

Then, every time the above-described charging data is notified, the common unit 20 adds the count value contained in the charging data to the count value of the adding counter 21A, thereby updating the adding counter 21A (step 505, step 507, step 508 and step 510).

The common unit 20 again requests the call separate processing unit 10 to acquire the charging data after the charging data up to the 63rd charging data have been notified (step 511).

Subsequently, a similar process operation as defined from the step 502 to the step 510 is carried out. In other words, the charging data is notified from the call separate processing unit 10 to the common unit 20 (step 512, step 514, and step 516). Then, the updating operation of the adding counter 21A is carried out (step 513, step 515, and step 517).

(B) Counter Switching Process

Figure 6:
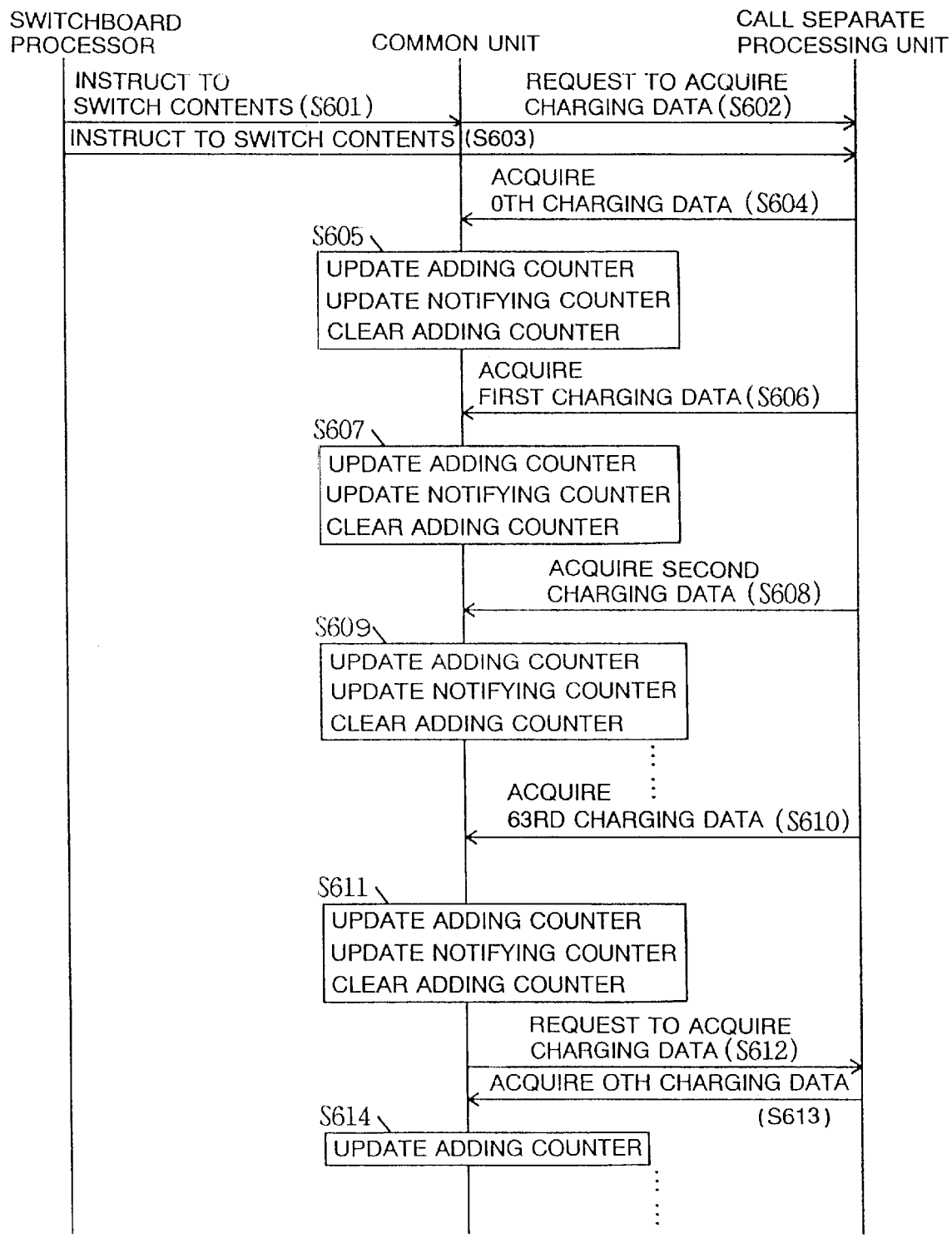
FIG. 6 is a sequence diagram for showing a surface switching process operation performed in the ATM switching system of the embodiment.

FIG. 6 is a sequence diagram for indicating the counter switching process.

First, the control unit 31 of the switchboard processor 30 (will be explained as "switchboard processor 30" hereinafter) instructs the common unit 20 to switch the counter (step 601), and also instructs the call separate processing unit 10 to switch the counter (step 603).

Then, when the switchboard processor 30 instructs switching of the counter, the common unit 20 requests the call separate processing unit 10 to acquire the charging data (step 602).

Next, the call separate processing unit 10 notifies the 0th charging data based on the count value of the current counter 11B to the common unit 20 (step 604).

Then, when the above-described charging data is notified, the common unit 20 adds the count value contained in the charging data to the count value of the adding counter 21A, thereby updating the count value of the adding counter 21A. Then, the count value of the adding counter 21A is added to the count value of the notifying counter 21B, thereby updating the count value of the notifying counter 21B. Thereafter, the count value of the adding counter 21B is cleared (step 605).

Subsequently, the call separate processing unit 10 notifies the charging data up to the 63rd charging data at maximum to the common unit 20 (step 604, step 606, step 608). The reason why the total charging data are limited to the 63rd charging data at maximum is such that the total number of lines connectable with a single call separate processing unit 10 is 4,096, and the Nth charging data (N=0 to 63) is constructed by containing the charging data for the 64 lines.

Then, every time the above-described charging data is notified, the common unit 20 adds the count value contained in the charging data to the count value of the adding counter 21A, thereby updating the count value of the adding counter 21A. Then, the count value of the adding counter 21A is added to the count value of the notifying counter 21B, thereby updating the count value of the notifying counter 21B. Thereafter, the count value of the adding counter 21B is cleared (step 607, step 608, and step 611).

Subsequently, the common unit 20 requests the call separate processing unit 10 to acquire the charging data (step 612).

Then, the call separate processing unit 10 notifies the 10th charging data based on the count value of the previous counter 11A to the common unit 20 (step 613).

Furthermore, the common unit 20 updates the count value of the adding counter 21A (step 614).

(C) Aggregation Process

Figure 7:
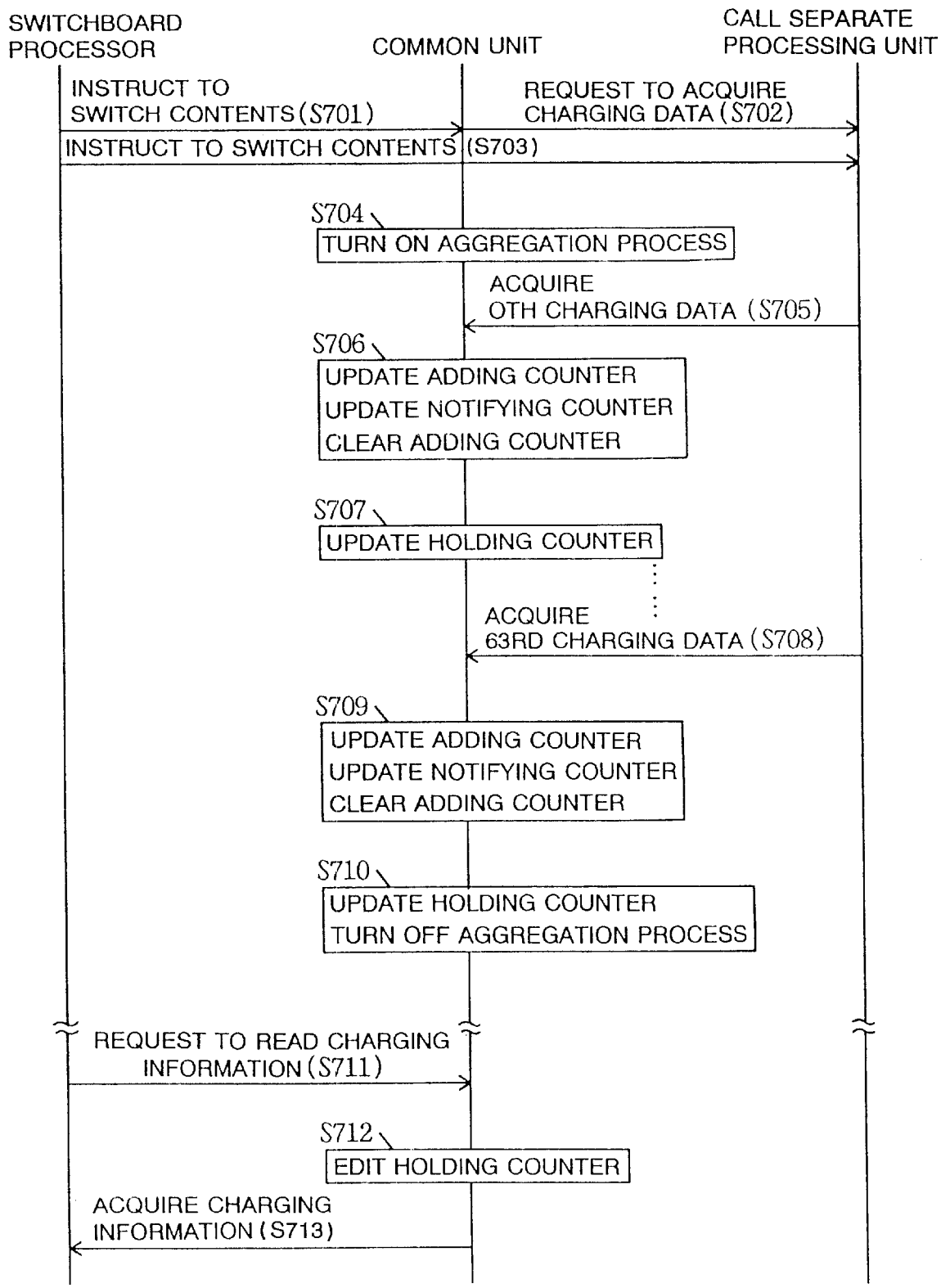
FIG. 7 is a sequence diagram for indicating an aggregation interval process operation in the ATM switching system of the embodiment.

FIG. 7 is a sequence diagram for explaining the aggregation process.

First, the switchboard processor 30 instructs the common unit 20 to switch the counter (step 701) and also instructs the call separate processing unit 10 to switch the counter (step 703).

When the counter switching operation is instructed from the switchboard processor 30, the common unit 20 requests the call separate processing unit 10 to acquire the charging data (step 702).

Next, the common unit 20 turns ON the aggregation process (step 704).

Next, the cell separate processing unit 10 notifies the 0th charging data based on the count value of the current counter 11B to the common unit 20 (step 705).

Then, when the above-described charging data is notified, the common unit 20 adds the count value contained in the charging data to the count value of the adding counter 21A, thereby updating the count value of the adding counter 21A. Then, the count value of the adding counter 21A is added to the count value of the notifying counter 21B, thereby updating the count value of the notifying counter 21B. Thereafter, the count value of the adding counter 21B is cleared (step 706).

Then, the common unit 20 updates the count value of the holding counter 21C (step 707).

Subsequently, the call separate processing unit 10 notifies the charging data up to the 63rd charging data at maximum to the common unit 20 (step 708). The reason why the total charging data are limited to the 63rd charging data at maximum is such that the total number of lines connectable with a single call separate processing unit 10 is 4,096, and the Nth charging data (N=0 to 63) is constructed by containing the charging data for the 64 lines.

Next, every time the above-described charging data is notified, the common unit 20 adds the count value contained in the charging data to the count value of the adding counter 21A, thereby updating the count value of the adding counter 21A. Then, the count value of the adding counter 21A is added to the count value of the notifying counter 21B, thereby updating the count value of the notifying counter 21B. Thereafter, the count value of the adding counter 21B is cleared (step 709).

Then, the common unit 20 updates the count value of the holding counter 21C and turns OFF the aggregation process (step 710).

Next, the switchboard processor 30 requests the common unit 20 to read out the above-described charging information (step 711).

Then, when the readout operation of the charging information is requested, the common unit 20 edits the holding counter 21C (step 712), and notifies the charging information to the switchboard processor 30 (step 713).

(D) Long Time Call Judging Process

Figure 8:
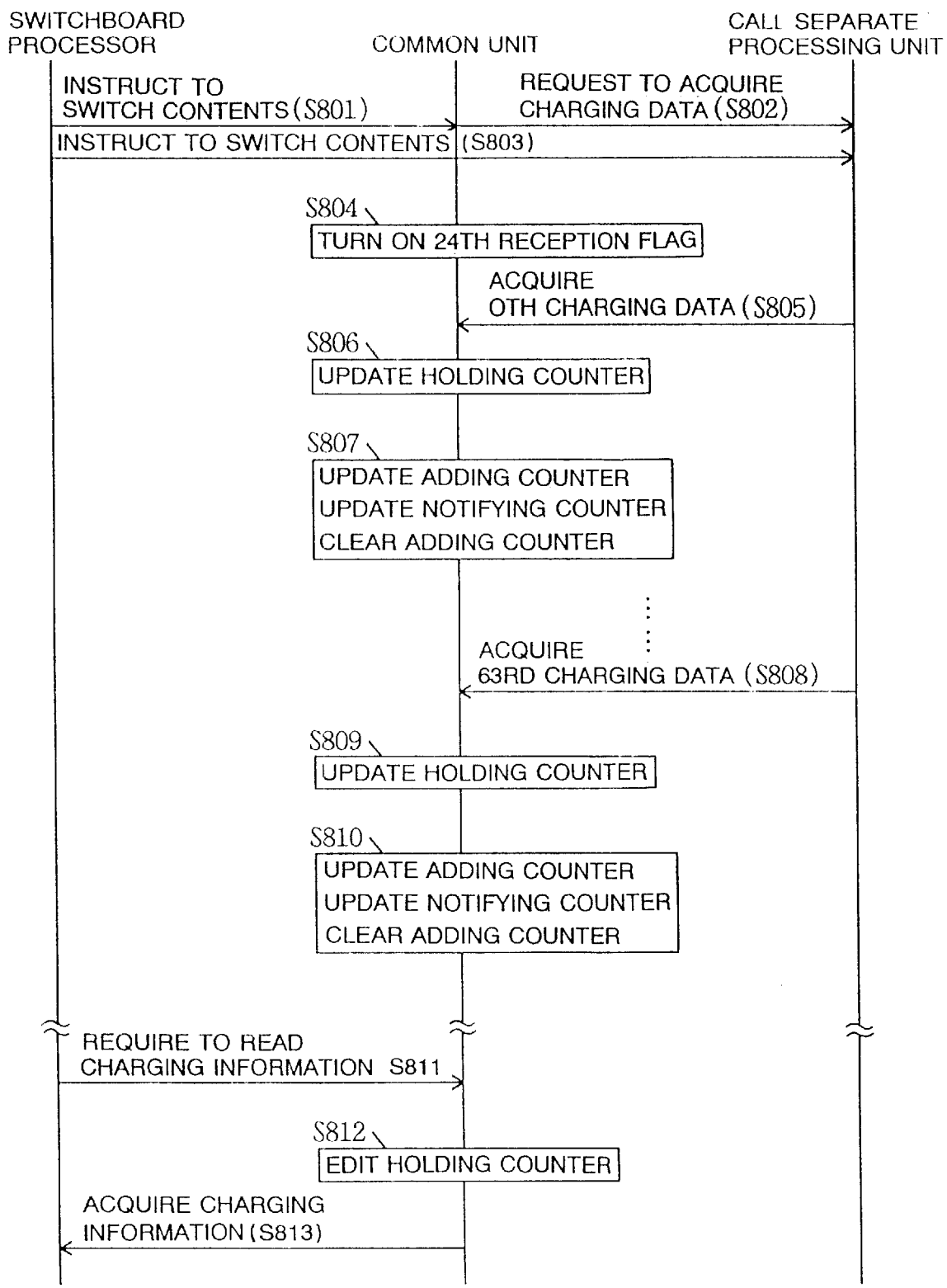
FIG. 8 is a sequence diagram for describing the long time call judging process.

FIG. 8 is a sequence diagram for describing the long time call judging process.

First, the switchboard processor 30 instructs the common unit 20 to switch the counter (step 801) and also instructs the call separate processing unit 10 to switch the counter (step 803).

When the counter switching operation is instructed from the switchboard processor 30, the common unit 20 requests the call separate processing unit 10 to acquire the charging data (step 802).

Next, the common unit 20 turns ON the 24-hour reception flag (step 804).

Next, the cell separate processing unit 10 notifies the 0th charging data based on the count value of the current counter 11B to the common unit 20 (step 805).

Then, the common unit 20 updates the count value of the holding counter 21C (step 806).

Then, when the above-described charging data is notified, the common unit 20 adds the count value contained in the charging data to the count value of the adding counter 21A, thereby updating the count value of the adding counter 21A. Then, the count value of the adding counter 21A is added to the count value of the notifying counter 21B so as to thereby update the count value of the notifying counter 21B. Thereafter, the count value of the adding counter 21B is cleared (step 807).

Subsequently, the call separate processing unit 10 notifies the charging data up to the 63rd charging data at maximum to the common unit 20 (step 808). The reason why the total charging data are limited to the 63rd charging data at maximum is such that a total number of lines connectable with a single call separate processing unit 10 is 4,096, and the Nth charging data (N=0 to 63) is constructed by containing the charging data for the 64 lines.

Next, every time the charging data is notified, the common unit 20 updates the count value of the holding counter 21C (step 809).

Then, every time the above-described charging data is notified, the common unit 20 adds the count value contained in the charging data to the count value of the adding counter 21A, thereby updating the count value of the adding counter 21A. Then, the count value of the adding counter 21A is added to the count value of the notifying counter 21B, thereby updating the count value of the notifying counter 21B. Thereafter, the count value of the adding counter 21B is cleared (step 810).

Next, the switchboard processor 30 requests the common unit 20 to read out the above-described charging information (step 811).

Then, when the readout operation of the charging information is requested, the common unit 20 edits the holding counter 21C (step 812), and notifies the charging information to the switchboard processor 30 (step 813).

(E) SVC Conversation Ending Process

Figure 9:
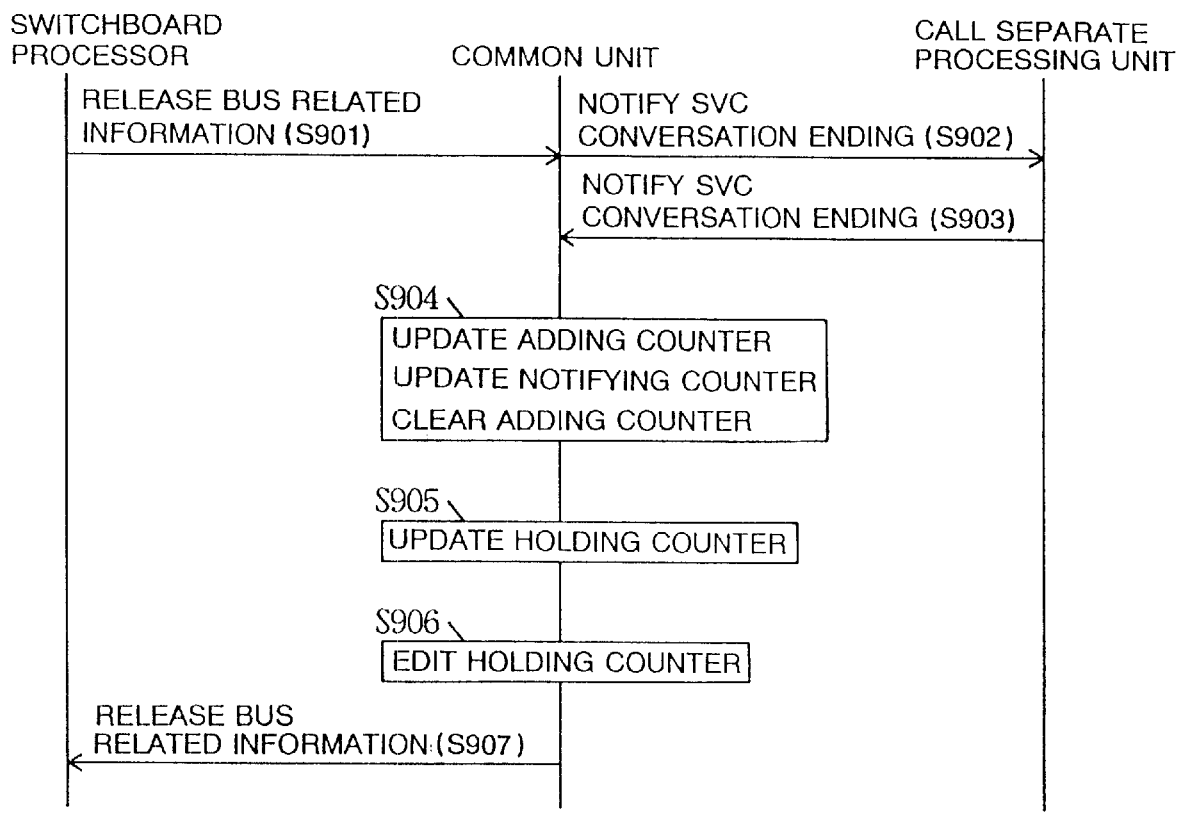
FIG. 9 is a sequence diagram for representing a SVC conversation ending process operation in the ATM switching system of the embodiment.

FIG. 9 is a sequence diagram for explaining the SVC conversation ending process.

First, the switchboard processor 30 notifies a release of bus related information to the common unit 20 (step 901).

Then, when the release of the bus related information is notified from the switchboard processor 30, the common unit 20 requests the call separate processing unit 10 to execute the SVC conversation ending process (step 902).

Next, the call separate processing unit 10 notifies the SVC conversation completion to the common unit 20 (step 903).

Next, the common unit 20 adds the count value contained in the charging data to the count value of the adding counter 21A, thereby updating the count value of the adding counter 21A. Then, the count value of the adding counter 21A is added to the count value of the notifying counter 21B, thereby updating the count value of the notifying counter 21B. Thereafter, the count value of the adding counter 21B is cleared (step 904).

Then, the common unit 20 updates the count value of the holding counter 21C (step 905).

Furthermore, the common unit 20 edits the count value of the holding counter 21C (step 906).

Then, the common unit 20 notifies the release of the bus related information to the switchboard processor 30 (step 907).

In accordance with the first to sixth ATM switchboards of the present invention, the charging information processing unit temporarily stores therein the charging data acquired from the charging data processing unit, and thereafter notifies the charging information to the control unit. In other words, the control unit does not directly acquire the data required for the charging process from the charging data processing unit, but acquires such data via the charging information processing unit. As a consequence, the amount of the communications established between the control unit and the charging information processing unit becomes smaller than that established between the charging data processing unit and the charging information processing unit, so that the data communication amount used to acquire the data necessary for the charging process can be suppressed.

In accordance with the seventh ATM switchboard of the present invention, since the charging data are added to each other with respect to the sections for the charging rates per unit time so as to produce the charging information in the charging information processing unit, the charging processes for such a case that the charging rates are different depending on the time range, can be carried out while suppressing the data communication amount used to acquire the data necessary for the charging process.

What is claimed is:

1. An ATM (asynchronous transfer mode) switching system comprising:

a charging data processing unit for counting a quantity of transmitted ATM cells with respect to each of transmission destinations, and for notifying a count value as charging data;

a first charging information processing unit for requesting said charging data processing unit to notify said charging data, and for notifying charging information produced based on said charging data;

a second charging information processing unit for requesting said charging data processing unit to notify said charging data, for temporarily storing therein said notified charging data, and further for notifying the charging information produced based on said charging data; and a control unit for requesting said charging information processing units to notify said charging information, wherein said control unit requests notification of said first or second charging information in a preselected time period when each said transmission destination is connected in a permanent virtual connection mode; and requests notification of said charging information when a telephone conversation is completed when each said transmission destination is connected in a switched virtual connection mode.

2. An ATM (asynchronous transfer mode) switching system comprising:

a charging data processing unit for counting a quantity of transmitted ATM cells with respect to each of transmission destinations, and for notifying a count value as charging data;

a first charging information processing unit for requesting said charging data processing unit to notify said charging data, and for notifying charging information produced based on said charging data;

a second charging information processing unit for requesting said charging data processing unit to notify said charging data, for temporarily storing therein said notified charging data, and further for notifying the charging information produced based on said charging data; and a control unit for requesting said charging information processing units to notify said charging information, wherein said control unit requests notification of said first or second charging information every predetermined time when a telephone communication time of a call issued from one said transmission destination connected in a switched virtual connection mode, exceeds a predetermined time.

3. An ATM (asynchronous transfer mode) switching system comprising:

a charging data processing unit for counting a quantity of transmitted ATM cells with respect to each of transmission destinations, and for notifying a count value as charging data;

a first charging information processing unit for requesting said charging data processing unit to notify said charging data, and for notifying charging information produced based on said charging data;

a second charging information processing unit for requesting said charging data processing unit to notify said charging data, for temporarily storing therein said notified charging data, and further for notifying the charging information produced based on said charging data; and a control unit for requesting said charging information processing units to notify said charging information, wherein said charging data processing unit is provided with a unit for separately performing a call process with respect to each said transmission destination;

one said first and second charging information processing unit is connected to a call separate processing unit and is provided with a common unit for processing said ATM cells processed by said call separate processing unit in a batch processing manner; and said control unit is provided with such a switchboard processor for controlling said call separate processing unit via said common unit.

4. An ATM switching system as claimed in claim 1, wherein said control unit requests the notification of said first or second charging information when a standard time is changed within a predetermined time period.

5. An ATM (asynchronous transfer mode) switching system comprising:

a charging data processing unit for counting a quantity of transmitted ATM cells with respect to each of transmission destinations, and for notifying a count value as charging data;

a first charging information processing unit for requesting said charging data processing unit to notify said charging data, and for notifying charging information produced based on said charging data;

a second charging information processing unit for requesting said charging data processing unit to notify said charging data, for temporarily storing therein said notified charging data, and further for notifying the charging information produced based on said charging data; and a control unit for requesting said charging information processing units to notify said charging information, wherein said charging information processing unit adds said first or second charging data with each other with respect to the sections of charging rates per unit hour, depending upon time ranges.

\* \* \* \* \*